United States Patent Office 3,564,901
Patented Feb. 23, 1971

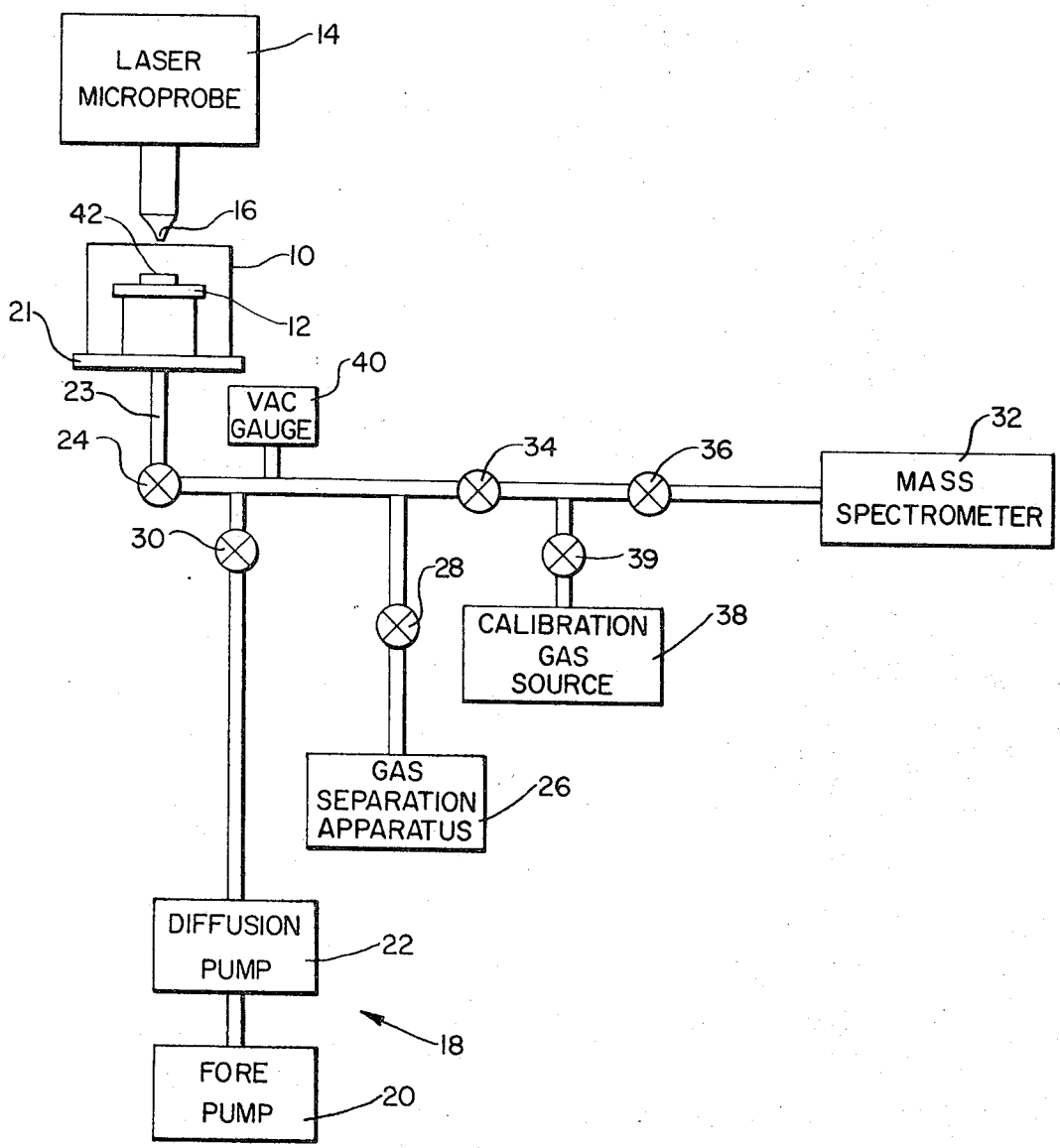

3,564,901
SYSTEM AND TECHNIQUE FOR GAS ANALYSIS
George H. Megrue, 6 Forest St.,
Lexington, Mass. 02173
Filed Sept. 25, 1968, Ser. No. 762,602
Int. Cl. G01n 27/00
U.S. Cl. 73—19                                           8 Claims

ABSTRACT OF THE DISCLOSURE

A system and technique for in situ analysis of gas constituents of a volatilized material and in particular for isotopic analysis of rare gases occluded within a meteorite to determine the compositional gradient of such meteorite. A microgram quantity of material from predetermined meteoritic regions is volatilized in a high vacuum and the gases released from these regions are isotopically analyzed to determine their identity and abundance at each of the predetermined regions.

FIELD OF THE INVENTION

This invention relates to gas analysis and more particularly to systems and techniques for the isotopic analysis of gases occluded within meteorites and other materials.

BACKGROUND OF THE INVENTION

Meteorites often contain primordial rare gases occluded therein, and in the study of such meteorites, measurement of the abundance of primordial rare gases provides data useful in postulating the early history of meteorites. Since the rare gases do not form chemical combinations, these gases exist in meteorites as they were originally in the formation of the meteorite, except that the abundance of such gases may vary from the original quantities by reason of the history of the meteorite in which the gases are occluded. Data concerning the relative abundance of such gases at different locations in the meteorite is especially useful in studying and determining the origin and formation of the meteoritic material. Heretofore, gases have been extracted for analysis by rather gross techniques which have not permitted the accurate determination of gas abundances at known localities of the meteorite.

Conventionally, a sample from a meteorite is vaporized in bulk in a vacuum system, or, alternatively, dissolved in an acid, to release occluded gases which are then analyzed to ascertain their identity and abundance. The sample which was vaporized or dissolved is initially separated from a larger meteorite mass by handpicking or by magnetic or specific gravity techniques, and it is difficult to determine, with any precision, the location in the heterogeneous mass from which a particular sample was taken. Moreover, the vaporized or dissolved sample itself is relatively large and so the occluded regions from which gases are released are not known. Thus, data concerning the rare gas content of the sample cannot be precisely correlated with specific locations from whence the gases were released. Such lack of correlation causes additional difficulty in comparing the rare gas data so obtained with other analytical procedures performed on a meteorite sample. It is, therefore, an object of the present invention to provide a manner and means of gas analysis by which variations in the isotopic abundances of rare gases in a meteorite can be effectively and controllably determined.

SUMMARY OF THE INVENTION

In accordance with the present invention, isotopic abundances of rare gases extracted in situ from a meteorite are analyzed in a manner which yields precise data concerning the location and quantity of each isotope. A microgram quantity of material is volatilized in a high vacuum from a specified region of a meteorite and the rare gases so released are isotopically analyzed to provide the intended data. The isotopic abundances of the gases released from a predetermined region are identifiable with that region since, according to the invention, only a precisely defined region is volatilized; thus, variations in the isotopic abundances of the rare gases occluded within different meteoritic regions can be effectively and controllably determined. By use of the present invention, in situ isotopic analysis of microgram samples of meteorites provides data which is compatible with the chemical, mineralogical and petrographic data otherwise obtained from meteorite samples so that data analysis can be conducted on a consistent basis.

In practicing the present invention, a polished sample of a meteorite to be analyzed is mounted within a vacuum chamber and is positionable relative to an accurately focused laser source such that particularly defined regions of the meteorite can be illuminated. The laser source and the meteorite sample are positioned with respect to each other and the laser focused onto a predetermined region of the sample to a degree such that a microgram region of the sample is volatilized in situ from the sample. Volatilization is performed in a high vacuum, generally of the order of $10^{-7}$ torr or less, which provides a minimum background of residual gases and hence greater sensitivity. Sensitivity is defined in this instance as the minimum quantity of gas detectable in the presence of a quantity of residual gases. The gases extracted by the precise and controlled volatilization which are not of interest, are separated by well known techniques such as by cryogenic sorption and gettering and the remaining rare gases analyzed in a mass spectrometer to provide data concerning the isotopic abundances thereof. Since the region of the meteorite from which the gases are emitted is accurately known, data of the isotopic abundance can be easily related to the particular region and the meteorite can be mapped to depict its compositional gradient.

Although the invention is especially useful in the analysis of primordial rare gases entrapped within meteorities, it will be appreciated that the invention is also useful in the extraction and analysis of the content of volatilized materials other than meteorites. In general, this invention is useful to ascertain the abundance of any material, whether solid, liquid or gas, which can exist in or be converted to a gas phase. For example, it may be desirable to ascertain the abundance of a solid or liquid constituent of a particular material and by volatilization of the material to produce a gas phase of this constituent, such abundance can be easily determined in accordance with the invention. In the analysis of meteorites, it is useful to measure the isotopic or elemental variation of carbon at various regions of the meteorite. This can be accomplished upon volatilization of a predetermined region by measuring the abundance of carbon monoxide produced and then ascertaining the elemental or isotopic abundance of carbon thereof.

The particular analytical procedure employed in determining the content of the volatilized gaseous constituents will depend upon the nature of the constituents. For example, for many gas constituents, a gas chromatograph can be employed, while, in the case of radioactive constituents, a radiation counter can be utilized. For analysis of stable isotopes, the mass spectrometer is usually required to achieve the intended sensitivity.

DESCRIPTION OF THE DRAWING

The invention will be more fully understood from the following detailed description, taken in conjunction with the accompanying drawing, the single figure of which is a diagrammatc representation of a gas analysis system embodying the invention.

DETAILED DESCRIPTION OF THE INVENTION

Referring to the drawing, there is shown a gas analysis system which is operative according to the invention to provide data concerning the isotopic abundances of rare gases released from a precisely defined and identified region of a meteorite. The system includes a vacuum chamber 10 having a stage 12 mounted therein for support of a sample 42. The chamber 10 is adapted for movement in three orthogonal axes, for example by means of a flexible coupling 23 and a moveable stage 21. Alternatively, a moveable stage within chamber 10 can be employed. A laser microprobe source 14 is provided having its objective 16 disposed in alignment with a transparent window of vacuum chamber 10 for illumination of sample 42, or the objective can be disposed within chamber 10. Pumping apparatus 18 is provided for evacuating chamber 10 to a suitable high vacuum. Vacuum apparatus 18 typically includes a fore pump 20 and a diffusion pump 22 coupled via valves 24 and 30 and the associated vacuum lines to chamber 10. Gas separation apparatus 26 is coupled to the vacuum chamber by means of valve 28 and a mass spectrometer 32 having its own pumping system and vacuum gauge, is coupled by means of respective valves 34 and 36 to the vacuum system. A calibrating gas source 38 is provided to introduce via valve 39 a measured sample of gas for suitable calibration of the mass spectrometer 32 in a well known manner, and a vacuum gauge 40 is provided to monitor the pressure of the vacuous environment within chamber 10 and the associated vacuum lines.

A vacuum is established within chamber 10 by the dual action of fore pump 20 and diffusion pump 22, of a degree such that residual gases which may be present are of a magnitude which will not materially affect the detection of gases released from a sample being analyzed. A static vacuum of $10^{-7}$ torr or less maintained within chamber 10 provides an environment suitable for practice of the invention. The vacuum environment is analyzed under static conditions by means of mass spectrometer 32 to determine the identity and quantity of residual gases in the system, thereby to ascertain the "background" in which subsequent analysis is to be conducted. In general, the background contains carbon monoxide, carbon dioxide, methane, helium, hydrogen, argon and water vapor.

A polished meteorite sample 42 located on stage 12 is positioned by means of the moveable stage with respect to objective 16 of laser source 14 such that a predetermined region of meteorite 42 is within the focus of the laser source. The laser source 14 is operative to volatilize in situ approximately 1 microgram of material from a selected portion of the meteorite 42. In a typical system a neodymium pulse laser having a power output of at least 0.2 joule reproducible to within 5% per pulse provides the necessary energy for volatilization of the material. The laser source includes a reflecting microscope and a laser having a common focal point so that the laser can be visually aligned with a region to be volatilized. A selected region of the meteorite sample 42 is optically positioned within chamber 10 beneath the laser source, and the laser energized to cause volatilization of the selected region. Gases such as carbon monoxide, carbon dioxide and methane released during the volatilization of the selected region are removed from the system by gas separation apparatus 26 such as cryogenic sorption and gettering apparatus, and isotopic analysis of the rare gases released from the volatilized region is performed by a high sensitivity mass spectrometer 32 under static vacuum conditions.

It is a particular feature of the invention that a known microgram region of the meteorite is volatilized to extract gases which are analyzed to provide information concerning the isotopic abundances of the defined region. Other selected regions of the meteorite sample can be similarly volatilized and thus, according to the invention, data is easily and controllably derived concerning varitions in the isotopic abundances of the several regions. A compositional gradient of the meteorite can thus be determined from the data derived from the several regions analyzed.

As an example of the operation of the invention, the tables below set forth the isotopic abundances of helium, neon and argon measured from the Fayetteville and Kapoeta meteorites and the isotopic abundance ratios computed from these measurements. The quantities noted in the tables as being less than ($<$) a stated value indicate that the particular isotopic abundance was less than the background level and therefore not measurable. The analytical procedure employed to obtain these measurements is briefly as follows. Polished sections of the meteorite were placed within vacuum chamber 10 on stage 12 and the vacuum system prepared to provide the requisite static vacuum. The system was pumped down to a pressure of $5 \times 10^{-4}$ torr as measured under static conditions by gauge 40, and while pumping continues, the system is heated at 120° C. for approximately eight hours to drive off adsorbed atmospheric gases and water vapor. After bake out, a static pressure of $5 \times 10^{-7}$ torr was obtained at room temperature. The mass spectrometer was calibrated in a well known manner, and the background spectrum of the vacuum system measured under static conditions to determine the identity and quantity of residual gases in the system. Selected regions of the meteorite were then volatilized, unwanted gases separated out of the system and the rare gases isotopically analyzed to determine their identity and abundances.

FAYETTEVILLE

Atoms $\times 10^{10}/10^{-4}$ g.

| Sample region: | $He^3$ | $He^4$ | $Ne^{20}$ | $Ne^{22}$ | $Ar^{36}$ | $He^3/He^4 \times 10^{-4}$ | $He^4/Ne^{20}$ | $Ne^{20}/Ar^{36}$ | $Ne^{20}/Ne^{22}$ | $He^4/Ar^{36} \times 10^4$ |
|---|---|---|---|---|---|---|---|---|---|---|
| 1 | 0.4 | 1,100 | 2.3 | 0.17 | <0.02 | 3.6 | 480 | | 13.5 | |
| 2 | 2.6 | 8,100 | 17 | 1.3 | 0.76 | 3.2 | 480 | 22 | 13.1 | 1.07 |
| 3 | <0.1 | 190 | <0.16 | <0.04 | <0.03 | | | | | |
| 4 | 1.6 | 5,600 | 14 | 1.1 | 0.51 | 2.9 | 400 | 28 | 12.7 | 1.10 |
| 5 | 1.4 | 4,500 | 7 | 0.50 | 0.41 | 3.1 | 640 | 17 | 14 | 1.10 |
| 6 | <0.1 | <10 | <0.16 | <0.04 | <0.02 | | | | | |

KAPOETA

Atoms $\times 10^{10}/2 \times 10^{-4}$ g.

| Sample region: | $He^3$ | $He^4$ | $Ne^{20}$ | $Ne^{22}$ | $Ar^{36}$ | $He^3/He^4 \times 10^{-4}$ | $He^4/Ne^{20}$ | $Ne^{20}/Ar^{36}$ | $Ne^{20}/Ne^{22}$ | $He^4/Ar^{36}$ |
|---|---|---|---|---|---|---|---|---|---|---|
| 1 | 0.10 | 290 | 3.0 | 0.25 | 0.10 | 3.4 | 97 | 30 | 12 | 2,900 |
| 2 | <0.05 | 48 | <0.16 | <0.03 | <0.02 | | | | | 2,500 |
| 3 | 0.13 | 570 | 5.0 | 0.40 | 0.23 | 2.3 | 114 | 22 | 12.5 | 2,500 |
| 4 | 0.21 | 730 | 5.9 | 0.54 | 0.17 | 2.9 | 124 | 35 | 11 | 4,300 |
| 5 | <0.05 | <10 | <0.16 | <0.03 | <0.03 | | | | | |

In the Fayetteville meteorite, five different regions of a polished section were analyzed according to the invention. Region 1 is a large single crystal within a dark vein, region 2 is a fine grained material along the border of the vein, region 3 is a large single crystal from the upper portion of the vein, and regions 4 and 5 are fine grained material between a larger grain structure. Region 6 is a chondrule. Five laser pulses were used to extract the gases from each selected region, each pulse volatilizing approximately $2 \times 10^{-5}$ grams of material to form a crater about 300 microns in diameter. The extracted gases were gettered over hot titanium, and argon was separated from helium and neon by liquid nitrogen. Isotopic abundances of helium and neon were measured in a mass spectrometer prior to admission and measurement of the argon.

In the Kapoeta meteorite, five different regions from three polished sections were analyzed and the laser pulses were employed in each region to extract gases for analysis. Region 1 is a fine grained material between fragments 50–100 mm. in size, region 2 is a large fragment adjacent region 1, regions 3 and 4 are fine grained material from a different polished section than region 1, and region 5 is a dark vein traversing the light phase in a third polished section.

The isotopic abundances of primordial helium, neon and argon are identified with the particular regions of the meteorite from which the gases were extracted. Thus, the relative abundances of the primordial gases in different meteoritic regions can be accurately determined, both as to the quantity of gas extracted and the location from which the gas was released.

As discussed hereinabove, the invention is broadly useful to ascertain the abundance of any material which can exist in or be converted to a gas phase. In the analysis of meteorites, for example, it is useful to determine the variation in the elemental carbon abundance and also the isotopic variation of carbon at various meteoritic regions. With regard to the Fayetteville and Kapoeta meteorites, the carrier of the primordial rare gases is believed to be similar in chemical composition to carbonaceous chondrites, and the isotopic ratio $C^{12}/C^{13}$ has been observed to vary between different meteorite classes and could be appreciably different from known values if the source of the carbon is primarily from the solar wind. Accurate determination of the elemental carbon abundances and isotopic carbon abundances can thus provide data useful in ascertaining the actual composition and structure of the meteorites as well as providing data useful in supporting theories of meteorite formation.

In the Fayetteville meteorite, the variation in carbon abundance between a chondrule (region 6) and the vein (region 2) was measured as follows. A single laser pulse from laser source 14 was employed to volatilize a predetermined portion of the vein (region 2). A pressure of $10^{-4}$ torr was measured in the vacuum chamber 10 and its associated vacuum lines. In this analysis, no gas separation was performed but rather the gas was admitted to mas spectrometer 32 at a controlled rate such that the pressure in the mass spectrometer was maintained at $10^{-6}$ torr under dynamic operating conditions. The mass spectrum of $C^{12}O^{16}+$ and $C^{13}O^{16}+$ was monitored and corrected 6% for the residual gases of the vacuum system. These residual gases were measured prior to the volatilization and under the same operating conditions. The measured $C^{12}C^{13}$ ratio was determinded to be within 1% of the terrestrial value. Likewise, the identical technique was used in analyzing the chondrule (region 2) except that two laser pulses were employed to volatilize this material, the difference in the $C^{12}O^{16}+$ signal per laser pulse in the vein (region 2) and the chondrule (region 6) was observed to differ by a factor of 6.8.

While the invention has been described with reference to the analysis of meteorites, the invention is not limited to such application. Rather, the invention is useful for the in situ extraction and analysis of any constituent material which are in a gas phase, especially where the precise spatial distribution of certain constituents is to be ascertained.

What is claimed is:

1. A method for determining the isotopic abundances of rare gases occluded within different regions of a meteorite comprising the steps of:
    (a) placing a meteorite sample in a vacuum chamber and providing therein a predetermined high vacuum;
    (b) positioning a laser source in operative relationship with a predetermined region of said sample;
    (c) energizing said laser source to volatilize in situ a microgram quantity of said predetermined region to release gases occluded therein;
    (d) separating the rare gases so released from other gases produced by said volatilization;
    (e) isotopically analyzing the separated gases to determine the identity and abundances thereof at said predetermined region; and
    (f) repeating steps (b), (c), (d) and (e) for selected other regions of said meteorite sample, thereby to provide data representative of the compositional gradient of said sample.

2. A method for determining the abundances of gas constituents produced from different regions of a volatilized material comprising the steps of:
    (a) placing a material sample in a vacuum chamber and providing therein a predetermined vacuum;
    (b) positioning a laser source in operative relationship with a predetermined region of said sample;
    (c) energizing said laser source to volatilize in situ a quantity of said predetermined region to produce gases therefrom;
    (d) anaylzing the gases so produced to determine the identity and abundances thereof at said predetermined region; and
    (e) repeating steps (b), (c) and (d) for selected other regions of said sample, thereby to provide data representative of the compositional gardient of said sample.

3. A method for determining the abundances of gas constituents produced from different regions of a volatilized material comprising the steps of:
    (a) placing a material sample in a vacuum chamber and providing therein a predetermined vacuum;
    (b) positioning a laser source to operative relationship with a predetermined region of said sample;
    (c) energizing said laser source to volatilize in situ a quantity of said predetermined region to produce gases therefrom;
    (d) separating the gases so produced by said volatilization;
    (e) analyzing the separated gases to determine the identity and abundances thereof at said predetermined region and
    (f) repeating steps (b), (c), (d) and (e) for selected other regions of said sample, thereby to provide data representative of the compositional gradient of said sample.

4. A system for analyzing the abundances of gas constituents produced from a volatilized material, said system comprising:
    a vacuum chamber containing means for supporting a sample to be analyzed;
    apparatus for providing a predetermined vacuum in said chamber;
    a laser source disposed in operative relationship with said chamber and operative to volatilize a microgram quantity of a sample supported therein;
    means for relatively positioning said laser source and said sample to align said sample for illumination of a predetermined region thereof; and
    means for analyzing the gases produced by volatilization of said predetermined region of said sample to determine the abundances thereof at said predetermined region.

5. A system for analyzing the abundances of gas constituents produced from a volatilized material, said system comprising:

a vacuum chamber containing means for supporting a sample to be analyzed;

apparatus for providing a predetermined vacuum in said chamber;

a laser source disposed in operative relationship with said chamber and operative to volatilize a microgram quantity of a sample supported therein;

means for relatively positioning said laser source and said sample to align said sample for illumination of a predetermined region thereof;

means for separating the gases produced by volatilization of a predetermined region of said sample; and means for analyzing the separated gases to determine the abundances thereof at said predetermined region.

6. A system according to claim 5 wherein said apparatus for providing a predetermined vacuum includes means for maintaining said vacuum for analysis under static conditions.

7. A system according to claim 5 wherein said apparatus for providing a predetermined vacuum includes means for maintaining said vacuum for analysis under dynamic conditions.

8. A system according to claim 5 wherein said predetermined vacuum is of a degree to permit detection of the separated gases in the presence of residual gases.

References Cited

UNITED STATES PATENTS 3,251,217   5/1966   Evens et al. _____ 73—19X

OTHER REFERENCES

Robert Saltonstall, Jr.: Laser Technology, 1965, pp. 43–47, Library of Congress Cat. No. TK7872L353.

RICHARD C. QUEISSER, Primary Examiner

E. J. KOCH, Assistant Examiner

U.S. Cl. X.R.

73—15, 432